United States Patent [19]

Hundley

[11] Patent Number: 4,649,615

[45] Date of Patent: Mar. 17, 1987

[54] COMPLETE PULLER TOOL

[76] Inventor: Kenn W. Hundley, 1136 Larrabee, #313, Los Angeles, Calif. 90069

[21] Appl. No.: 618,925

[22] Filed: Jun. 11, 1984

[51] Int. Cl.⁴ .................................... B23P 19/04

[52] U.S. Cl. .................................... 29/261

[58] Field of Search .................. 29/261, 260, 259, 263

[56] References Cited

U.S. PATENT DOCUMENTS

| | | | |
|---|---|---|---|
| 236,429 | 1/1981 | Haupt et al. . | |
| 1,043,400 | 11/1912 | Collison . | |
| 1,131,868 | 3/1915 | Ridlon . | |
| 1,313,511 | 8/1919 | Beach | 29/261 |
| 1,393,026 | 10/1921 | Kepler . | |
| 1,456,735 | 4/1982 | Hunt . | |
| 1,515,445 | 3/1924 | Smith . | |
| 1,599,738 | 5/1925 | Atkins . | |
| 1,688,535 | 10/1928 | Ellis et al. | 29/261 |
| 1,709,913 | 7/1927 | Kaplan . | |
| 2,427,948 | 9/1947 | Cornwell | 29/261 |
| 4,084,305 | 4/1978 | Chang | 29/261 |

*Primary Examiner*—Robert C. Watson
*Attorney, Agent, or Firm*—Spensley Horn Jubas & Lubitz

[57] ABSTRACT

A combination tool for pulling gears, battery terminals, pilot bearings, wheel hubs, tie rods, steering wheel, harmonic balances and Pitman arms and for flaring pipes. The tool includes a yoke having four arms, each of which has an open-ended slot and a pin hole at the end of each arm. An arm pin in each arm provides a jaw member stop surface for large griping diameter pulling applications, and alternatively attaches the jaw member directly to the yoke arm for small gripping diameter applications. For other applications, a jaw member having an overhanging head is inserted into one or more yoke arm slots.

15 Claims, 15 Drawing Figures

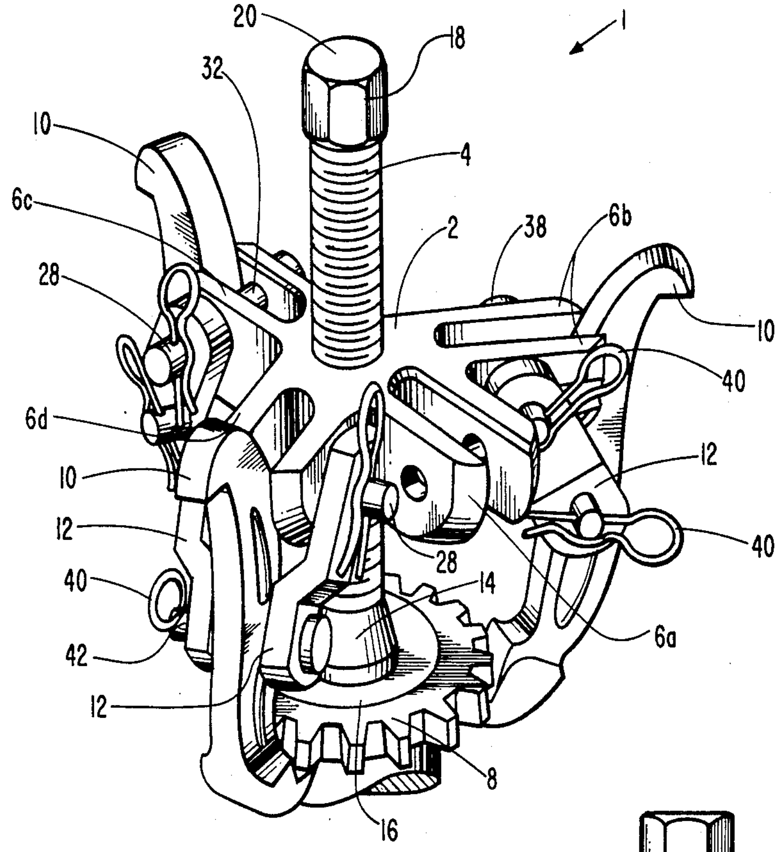
Fig. 1.
Fig. 3.
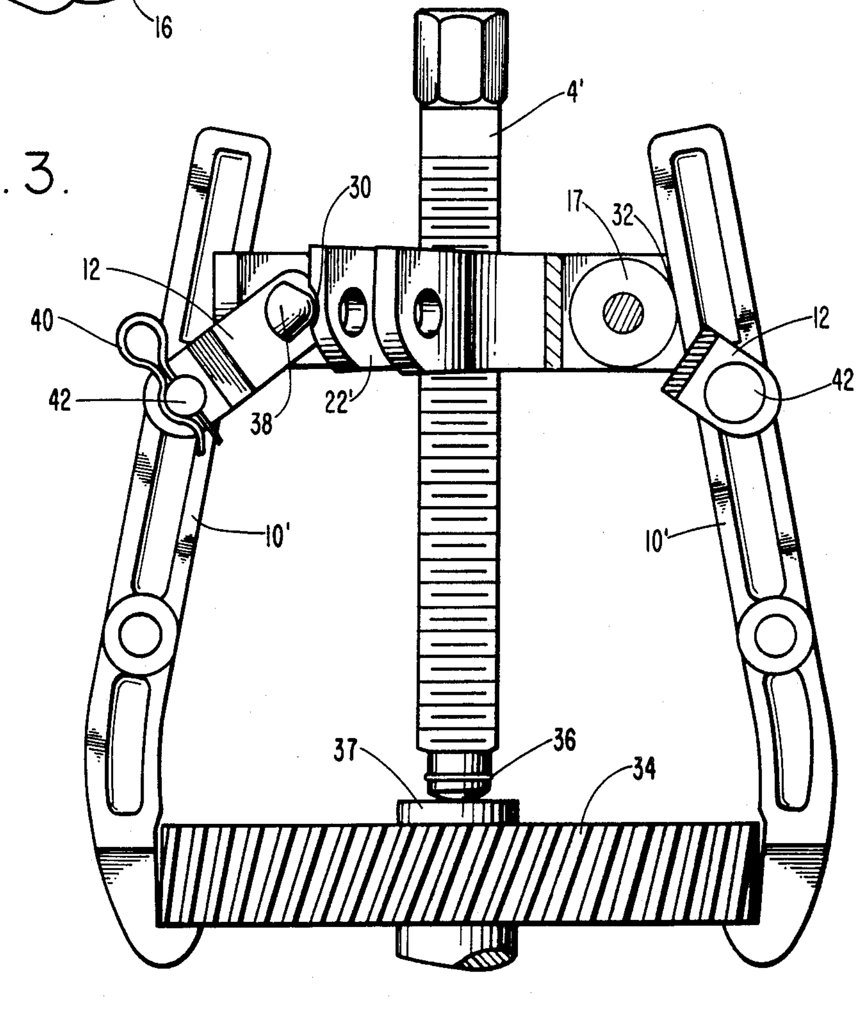
Fig. 4.
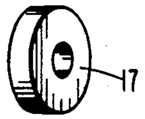

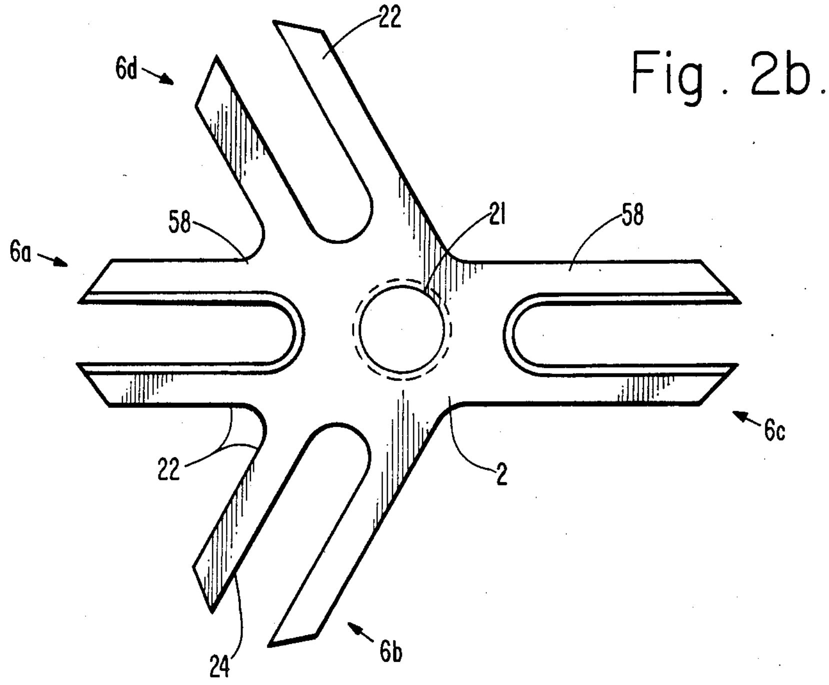
Fig. 2b.
Fig. 2c.
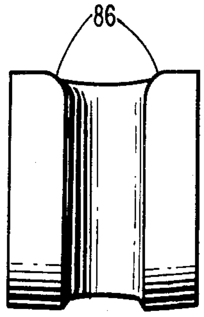
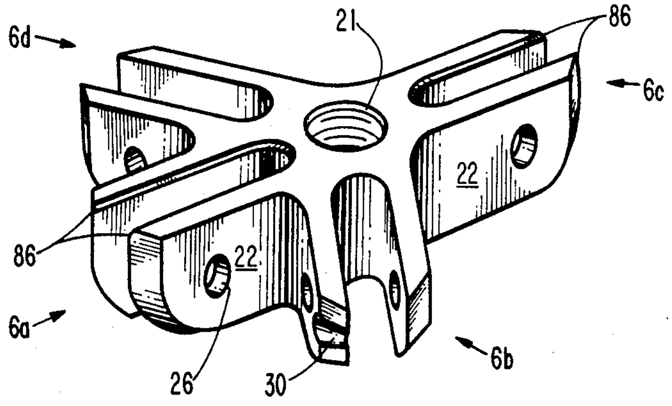
Fig. 2a.

Fig. 7.
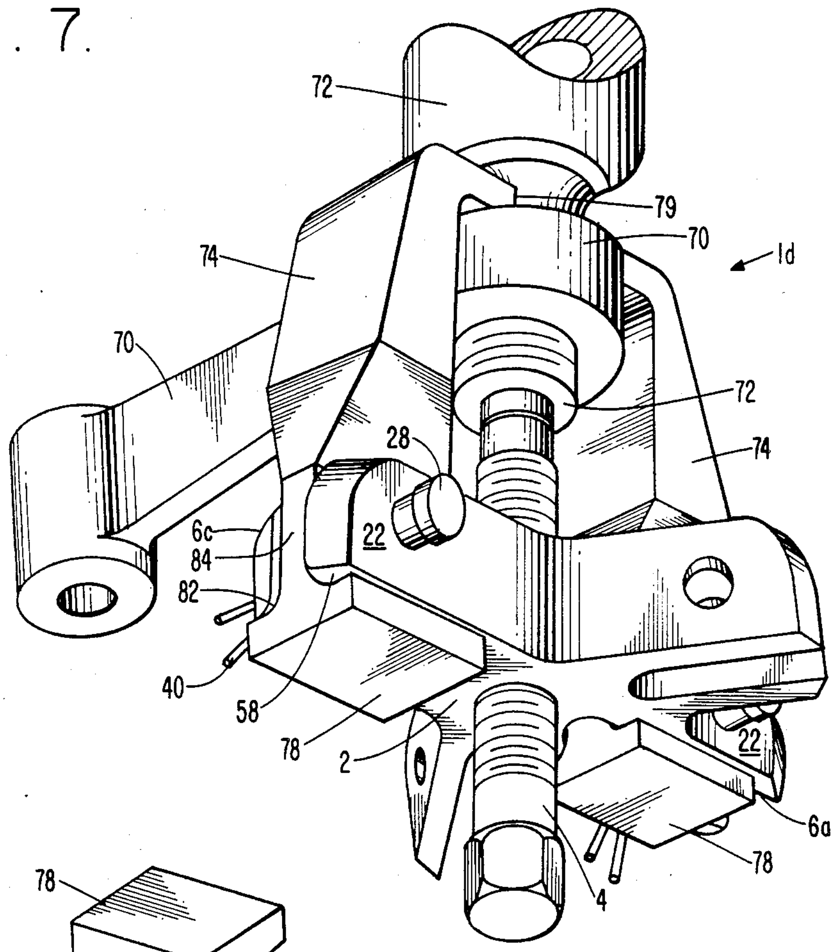
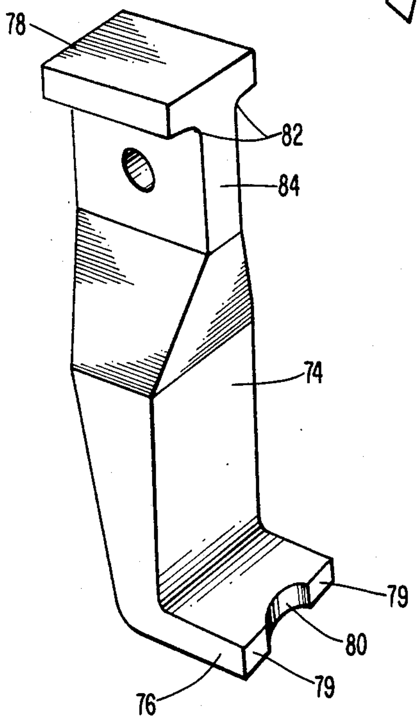
Fig. 8.

COMPLETE PULLER TOOL

BACKGROUND OF THE INVENTION

1. Field of the Invention

The present invention relates to tools, and more particularly, to tools for machinery repair.

2. Description of the Prior Art

In the repair of automobiles, aircraft and other mechanical devices, it is often necessary to use special tools to forceably separate one mechanical component from another. For example, in order to remove a gear from the shaft upon which it rotates, a tool known as a gear puller is used. These pullers have typically included a yoke and a large threaded bolt which passes through the center of the yoke. Two or more hook-shaped jaws are coupled by extender members to the arms of the yoke. The jaws are hooked onto the gear and the central bolt is rotated until it engages the shaft carrying the gear. As the central bolt rotates, the gear is pulled off the shaft.

One problem associated with gear pullers of this type is that the diameter of the gear for which the tool may be used is determined to a large extent by the size of the yoke. Thus, to pull gears of varying size, yokes of corresponding sizes are often necessary. In addition, the yoke arms of many prior art gear pullers have not been strong enough to withstand the pressures exerted and as a result have broken.

Other components which require a tool to remove the component from a shaft for repair include steering wheels and harmonic balancers. However, gear pullers of the prior art have not typically been used for these applications because there is often not an appropriate place for the jaws to grip. Hence, separate tools to remove steering wheels and harmonic balancers have been devised.

Still other components which can require a removal tool include battery terminals. Conventional gear pullers have been found unsuitable because the gripping radius of such tools is often too wide to properly grip the battery terminal.

Conventional gear pullers have also generally been found unsuitable for separating the Pitman arm from the steering shaft of an automobile. Previous devices devised for this task have typically included an integral yoke and jaw arrangement to provide sufficient strength to remove the Pitman arm without breaking the puller tool. However, because the steering shafts of domestic and import cars often have different diameters, the integral structure has led to the need for different sized Pittman arm pullers to accommodate different sized steering shafts.

Thus, in order to achieve all of the previously stated tasks, it has often been found necessary to buy or rent a separate tool for each function. This can be costly or require a lot of storage space for all the tools. Some of the previous tools can be hazardous to operate since the associated functions may require a significant amount of force and consequently the parts to be removed may easily be damaged in the process. Some of these tools require a large amount of space to remove a part causing the removal of additional parts in order to have sufficient access to the part to be removed.

SUMMARY OF THE INVENTION

An object of this invention is to provide a tool which is capable of performing all of these previously stated functions at a substantially lower cost.

It is another object of the present invention to provide a tool which uses a minimal amount of storage space while requiring less operating space and achieving these tasks with less danger to the mechanic and less wear on the tool and the parts to be removed.

A further object of this invention is to provide a stronger puller tool which is capable of withstanding significantly more stress than many conventional puller tools.

A further object is to provide a puller tool which offers a wide varity of gripping diameters for removal of gears, pulleys, suspension parts and battery terminals.

Another object of this invention is to provide a Pitman arm puller which is capable of removing domestic or foreign sized Pitman arms.

Still another object of this invention is to provide a Pitman arm puller which employs removable jaws for easier access to the Pitman arm.

A further object of this invention is to provide a tool capable of separating the rod joints of an automobile without the force and wear imposed on the parts by many conventional tie rod splitters.

Another object of this invention is to provide a tool which is capable of removing steering wheels and harmonic balances on most autos.

Still another object of this invention is to provide a new method and apparatus for removing pilot bearings from crankshaft ends that is safer to the mechanic and requires less operating space than many previous methods and apparatus.

Another object of this invention is to provide a tool which is capable of flaring pipe ends.

These and other objects and advantages are achieved in a tool in accordance with the present invention, for removing a first element such as a gear from a second element such as a shaft. The tool includes a yoke having four arms and a central hole threaded through the yoke. A central threaded bolt is rotatably mounted within the central hole of the yoke and is adapted to engage the shaft or other second element. Each yoke arm has a pair of fingers which defines an open-ended slot at the end of the arm. Each yoke arm further has pin holes through the arm fingers.

In one embodiment of the present invention, the tool further includes extender members pivotally coupled at one end to the yoke arms by means of arm pins inserted through the arm pin holes. Each extender member has a hook-shaped jaw member pivotally coupled to the other end of the extender member, to grip a gear or other first element while the central bolt engages the shaft or other second element. As the central bolt is rotated, thereby driving the central bolt against the shaft, the jaw members pull the gear from the shaft.

In accordance with the present invention, the arm pins of each yoke arm provide a stop surface for the jaw members, which defines the effective gripping diameter for those particular jaw members. This gripping diameter may be easily increased by placing an extension member such as a washer around each arm pin to radially displace the stop surface outward. Accordingly, the need for utilizing yokes of various sizes to provide varied gripping diameters is eliminated.

In an alternative embodiment, the extender members are removed and the same or substitute jaw members are attached directly to the yoke arms by means of the arm pins. Consequently, the tool may be used for applications requiring a much smaller gripping diameter such as the removal of a battery terminal from the terminal post, for example.

In still another embodiment of the present invention, for those component separation applications requiring a great deal of pulling force, such as the removal of a Pitman arm from the steering shaft of an automobile, a unique jaw member having an overhanging head portion may be substituted for the previously described jaw members. This latter jaw member is carried within the slot of a yoke arm and has an overhanging head portion which engages the top surface of the arm. Because the arm is removable, the arm may be adapted to accommodate steering shafts of different sizes. In addition, the arms may be reversed so that the tool may be used for other applications such as removing wheel hubs from axles.

BRIEF DESCRIPTION OF THE DRAWINGS

FIG. 1 is an isometric view of a puller tool in accordance with the present invention shown in position to remove a crankshaft gear from a shaft;

FIG. 2A is an isometric view of the yoke of FIG. 1;

FIG. 2B is an aerial view of the yoke of FIG. 2A;

FIG. 2C is an elevational view of the end of one of the yoke arms of the yoke of FIG. 2A;

FIG. 3 is an elevational and partial sectional view of an alternative embodiment of the puller tool of FIG. 1 shown in position to remove a camshaft gear;

FIG. 4 is an isometric view of an extension member of the puller tool of FIG. 3;

FIG. 7 is an isometric view of an alternative embodiment of the puller tool of FIG. 1 shown in position to remove a Pitman arm from a shaft;

FIG. 8 is an isometric view of a jaw member of the puller tool of FIG. 7;

DETAILED DESCRIPTION OF THE DRAWINGS

Figure 5:
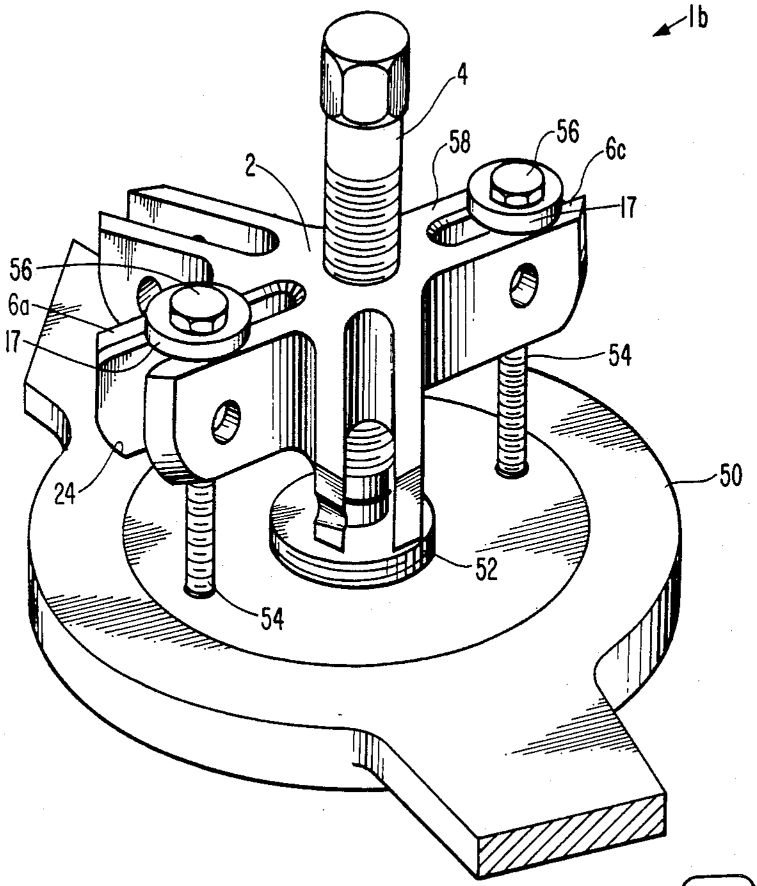
FIG. 5 is an isometric view of an alternative embodiment of the puller tool of FIG. 1 shown in position to remove a steering wheel from a shaft.

Referring now to FIG. 1, a puller tool in accordance with a preferred embodiment of the present invention is indicated generally at 1. The puller tool 1 includes a main body or yoke 2 (best seen in FIGS. 2A–2C) and a central threaded bolt 4 passing through the center of the yoke 2. The yoke 2 has four arms, designated *6a–6d* to which means are selectively coupled to engage a first element such as the crankshaft gear 8 shown in FIG. 1. Specifically, the puller tool 1 of the illustrated embodiment has three hook-shaped jaw members 10 which are hooked to the crankshaft gear 8. Each jaw member 10 has a pair of extender members 12 which are pivotally coupled to the associated jaw member 10 at one end and to the associated yoke arm at the other end.

The central bolt 4 has an adapter tip 14 at one end, which engages the crankshaft 16 as the central bolt 4 is rotated. Flats 18 provided at the other end of the central bolt 4 allow the bolt 4 to be gripped by a wrench or other tool to impart a rotational force to the bolt 4. As the central bolt 4 is rotated, the yoke 2 is driven towards the end 20 of the bolt 4, pulling the jaw members 10 with it thereby removing the crankshaft gear 8 from the crankshaft 16.

The yoke 2 of the illustrated embodiment may be seen more clearly in FIGS. 2A–2C. The yoke 2 shown therein is utilized in each of the embodiments described herein.

As best seen in FIG. 2B, the yoke arms *6a–6d* are spaced relative to each other so that two of the arms, arms *6a* and *6c*, are diametrically opposed and three of the arms, arms *6b–6d*, are equally spaced from each other. Each arm has a pair of spaced fingers 22 which defines an open-ended slot 24 in each yoke arm. Each yoke arm further has an arm pin hole 26 in each arm finger through which an arm pin 28 (FIG. 1) may be inserted. To facilitate the insertion of an arm pin through the arm pin holes 26 of the yoke arm *6a*, the yoke arm finger 22' (FIG. 2A) of the yoke arm *6b* has a notch 30 aligned with the arm pin holes 26 of the yoke arm *6a*. The central bolt 4 (FIG. 1) is carried by a central threaded hole 21 of the yoke 2.

Many conventional gear pullers do not have the double finger open slot structure of the illustrated yoke. Instead these previous pullers have only a single finger/arm which is utilized to hold the extender members in place. The double fingered structure shown provides additional strength and safety over many gear pullers of the prior art.

A further advantage of the double fingered arm structure of the illustrated embodiment is best understood with respect to FIG. 1. As shown therein, the jaw members 10 do not engage the yoke arm itself but instead engage a stop surface 32 provided by the arm pin 28 of each yoke arm. The positioning of the stop surface 32 determines the effective gripping diameter of the jaw members 10 and hence the size of gear for which the tool may be used. For those conventional gear pullers where the jaw members engage the yoke arm itself, the gripping diameter is effectively fixed by the size of the jaw members and the yoke itself.

However, in accordance with the present invention, the stop surface may be easily displaced radially outward by placing an extension member such as a washer 17 (FIG. 4) around the arm pin 28 of each yoke arm as shown in FIG. 3. Thus, the stop surface 32' has been radially displaced outward thereby increasing the effective gripping diameter so that the same yoke 2 and same set of jaw members may be used to pull larger gears. The washer 17 has a thickness of $\frac{1}{4}$ inch in the illustrated embodiment.

FIG. 3 shows an alternative application of the present invention, utilizing longer jaw members 10' and a longer central bolt 4' with the yoke 2 of FIG. 1. The use of longer jaw members further facilitates the use of the tool for larger diameter gears such as camshaft gear 34. At the end of the central bolt 4' is a rubber O-ring 36 which is utilized to hold the adapter tip 14 to the end of the central bolt 4 when needed for applications such as that shown in FIG. 1.

Each arm pin 28 has an enlarged head 38 at one end and a pin clip hole at the other end. The arm pins are held in place by means of removable arm pin clips 40 passing through the hole at the end of each arm pin 28. The arm pin passing through the yoke arm 6a has a special enlarged head 38' as shown in FIG. 3 to allow the arm pin head to pass through the notch 30 of the yoke arm 6b finger 22'. The jaw members 10 and 10' are pivotally coupled to the extender members 12 by means of pins 42 and pin clips 40. The jaw members 10 and 10', extension members 12 and pins 28 and 42 are easily disassembled and removed from the yoke 2 by removing the pin clips 40.

The arm pins of conventional gear pullers are typically 5/16 inches in diameter whereas the arm pins utilized in the illustrated embodiment are ⅜ inches in diameter. Thus the puller tools of the present invention provide more strength and therefore additional safety when operated under heavy pressure.

Referring now to FIG. 5, the same yoke 2 of FIGS. 2A–2C is shown as a part of an alternative puller tool 1b which is being used to remove a steering wheel 50 from a shaft 52. The tool 1b has a pair of holding bolts 54 which are carried in the yoke arm slots 24 and are screwed into the steering wheel 50. The washers 17 of FIG. 3 are now disposed between the enlarged heads 56 of each holding bolt 54 and the flat upper surface 58 of each yoke arm. As the central bolt 4 is rotated, the steering wheel 50 is pulled free of the shaft 52. The tool 1b is then easily disassembled by unscrewing the holding bolts from the steering wheel 50.

Conventional steering wheel pullers generally do not provide these washers. Without the washers, the holding bolts can damage the arms of the puller yoke if the bolts have inadequate sized heads. Thus, as the steering wheel is being pulled, the holding bolts can be stripped of their heads thereby forcing the arms of the puller to separate and break. The washers 17 of the illustrated embodiment protect the spaced fingers 22 of each yoke arm as described above.

Figure 6:
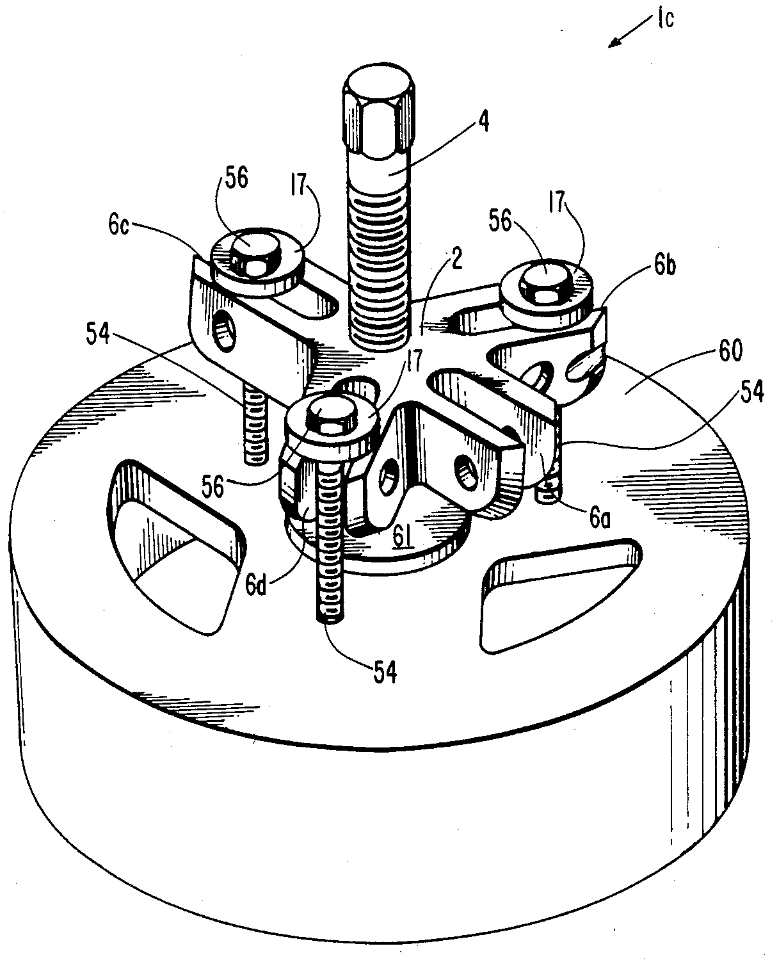
FIG. 6 is an isometric view of an alternative embodiment of the puller tool of FIG. 5 shown in position to remove a harmonic balancer from a shaft.

FIG. 6 shows another application of the yoke 2. There, an alternative puller tool 1c is in position to remove a harmonic balancer 60 from a shaft 61. Three holding bolts 54 carried by the yoke arms 6b–6c and 6d are screwed into the harmonic balancer 60 in combination with the washers 17 to prevent yoke arm distortion as previously described.

Many conventional harmonic balance pullers are rather fragile in construction as compared to the illustrated embodiment of the present invention. The yoke arms are typically much smaller on conventional harmonic balance pullers and the ends of the yoke arms are usually joined together which can provide visual obstructions when mounting the holding bolts into the harmonic balancer.

Further, most conventional harmonic pullers come equipped with a long central bolt. The illustrated embodiment of the present invention may utilize either a long or short central bolt such as those indicated at 4 or 4'. A harmonic balancer is located on the end of the crankshaft in front of the engine and is often as close as four inches from the radiator. In such case, the radiator must be removed when a long central bolt is used. This additional work may be avoided by the use of the tool 1c of the illustrated embodiment which utilizes the short central bolt 4 as shown.

Referring now to FIG. 7, a Pitman arm 70 is shown mounted on the bottom end of the steering shaft 72. The other end of the Pitman arm 70 is connected to a tie rod (not shown) which moves the front wheels of an automobile from left to right. A conventional Pitman arm puller tool typically has the jaws and the yoke cast as an integral unit. Thus, the spacing between the jaws in fixed. Consequently, it is often necessary to purchase two different conventional Pitman arm pullers to accommodate the Pitman arms on import cars which often have a smaller steering shaft than the Pitman arms of domestic automobiles.

The illustrated embodiment of the present invention indicated at 1d utilizes removable jaw members 74 such as those shown in FIG. 8 in combination with the yoke 2 to remove the Pitman arm 70 from the bottom of the steering shaft 72. The jaw members 74 are inserted into the open-ended slots 24 of the opposing arms 6a and 6c of the yoke 2. As best seen in FIG. 8, each jaw member 74 has an overhanging head portion 78 which engages the top flat surface portion 58 of the yoke arms 6a and 6c. Each jaw member 74 is secured to the yoke arms by means of the arm pins 28 and arm pin clips 40.

Each jaw member 74 has a hooked-shaped lower portion 76 which defines a pair of flat surfaces 79. The flat surfaces 79 are placed on either side of the steering shaft 72 with the spacing between opposing flat surfaces 79 of the two opposing jaw members 74 being sufficient to accommodate the steering shaft of an import automobile. As the central bolt 4 is rotated, the yoke 2 and jaw members 74 pull the Pitman arm 70 from the steering shaft 72.

As best seen in FIG. 8, the hooked lower portion 76 has a notch 80 between the flat surfaces 79 of the lower portion 76. The notch 80 is provided to accommodate the somewhat larger diameter typical of the steering shafts of domestic automobiles. Because the jaw members 74 are removable, the jaw members may be conveniently attached to the yoke 2 one at a time so that the steering shaft 72 of a domestic automobile is placed between opposing notches 80 of the two jaw members 74. Consequently, a single jaw member size may be used for both import and domestic automobiles.

The overhanging head portion 78 of each jaw member 74 has a concave surface 82 merging the overhanging head portion 78 with the stem 84 of the jaw member 74. Referring back to FIG. 2A, the yoke arm fingers 22 of the yoke arms 6a and 6c have convex curved surfaces 86 adapted to mate with the concave surfaces 82 of the jaw members 74 when attached to the yoke 2. The radius of these curved surfaces 82 and 86 is designed to decrease the stress on the overhanging portion 78 of the jaw members 74.

The customary way of separating a tie rod from an idler arm on the steering suspension of an automobile is to use a tie rod splitter. The tie rod splitter is generally shaped like a fork with two prongs. The fork is placed between the tie rod and idler arm and is struck with a hammer forcing the tie rod and the idler arm to separate. This method can damage the parts and is somewhat dangerous due to the possibility of one or more of the parts breaking.

Figure 9:
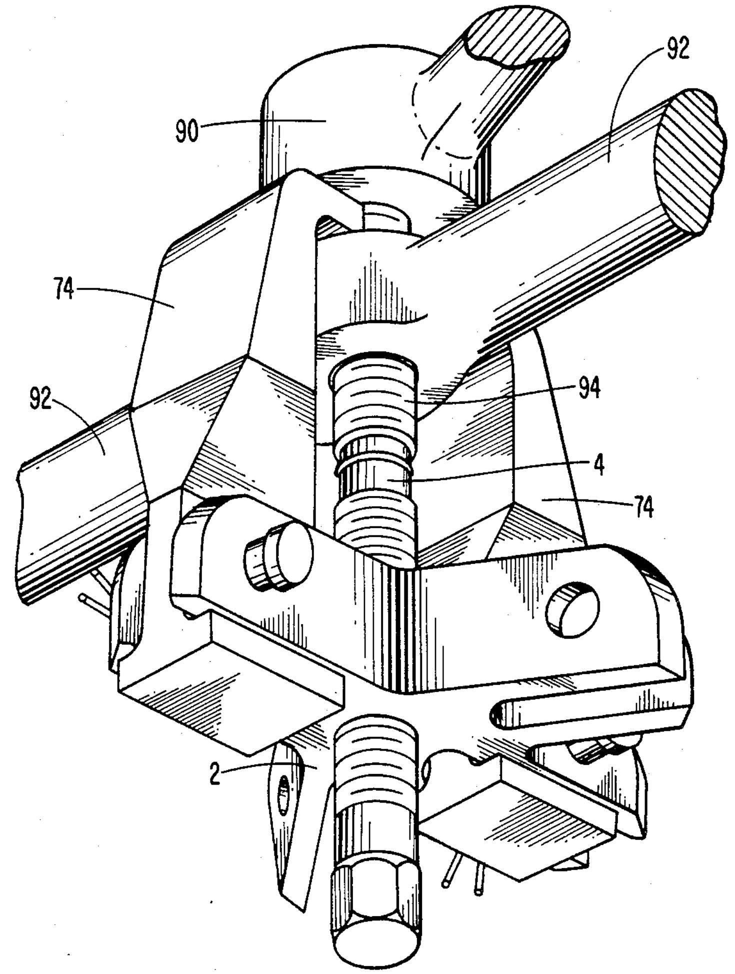
FIG. 9 is an isometric view of the puller tool of FIG. 7 shown in position to separate a tie rod from an idler arm.

The puller tool of the present invention utilizes a different method of removing these parts which is much safer to both the parts and the mechanic. In FIG. 9, the puller tool 1*d* of FIG. 7 is shown in position to separate a tie rod 92 from an idler arm 90. The same jaw members 74 of FIG. 8 may also be attached to the yoke 2 one at a time if necessary or convenient.

In the illustrated application, the idler arm 90 is attached to the tie rod 92 by means of a ball joint (not shown). A ball joint shaft 94 protrudes through the tie rod and is retained by a nut. When the central bolt 4 is rotated against the ball joint shaft 94, the tie rod 92 is pulled free without the use of hammers and their associated dangers.

Figure 10:
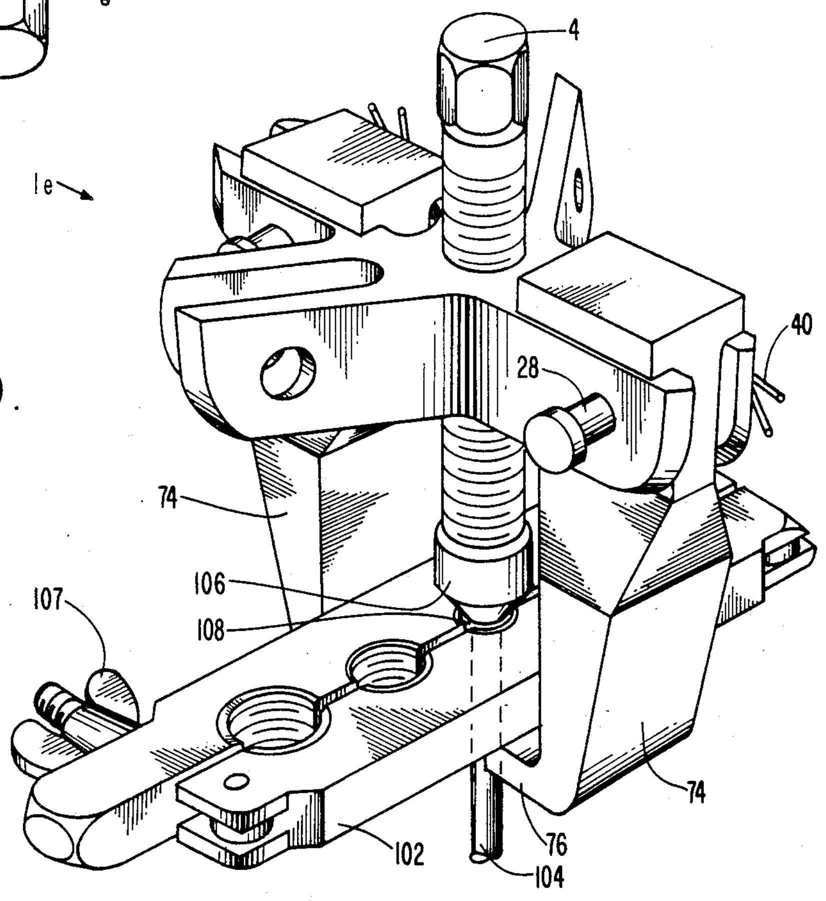
FIG. 10 is an isometric view of an alternative embodiment of the puller tool of FIG. 7 shown in position to flare a pipe end.

Conventional puller tools typically do not have the ability to flare a pipe end. Currently, separate tools have been provided for this function. As shown in FIG. 10, with the aid of a pipe holding block 102, and pointed bolt adapter 106, the puller tool 1*e* of the illustrated embodiment can accomplish this task. The pipe holding block 102 rests on the hooked lower portion 76 of the jaw members 74 previously described. The pin adapter 106 is placed at the end of the central bolt 4. A pipe 104 is secured in the block 102 by tightening block wing nuts 107. As the central bolt 4 is rotated, the adapter tip 106 engages against the pipe end 108 of the pipe 104, forcing the end to flare.

Figure 11:
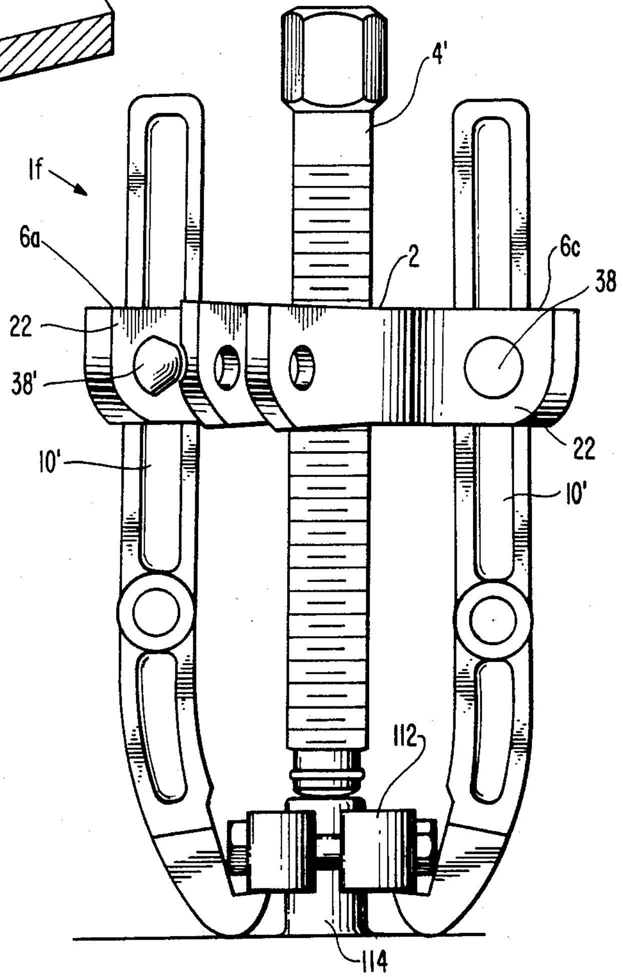
FIG. 11 is an elevational view of an alternative embodiment of the puller tool of FIG. 1 shown in position to remove a battery terminal from a battery post.

Conventional gear pullers are typically not capable of removing battery terminals from the battery terminal posts because the gripping diameter of the extender member connnected jaw members is generally too wide. As shown in FIG. 11, an alternative illustrated embodiment of the gear puller indicated at 1*f* can accomplish this function because the jaw members 10' (previously described in connection with FIG. 3) may be mounted directly to the yoke arms without the use of extender members which conventional gear pullers typically require to attach the jaw members to the yoke.

FIG. 11 shows the puller 1*f* in position to remove a battery terminal 112 from the battery post 114. The jaw members 10' are mounted in the yoke arm slots 24 between the jaw fingers 22 of the jaw arms 6*a* and 6*c* by means of the arm pins. As the central bolt 4' is rotated, the battery terminal 112 is pulled free of the battery post 114. Such an arrangement can also accommodate removing very small gears such as are incorporated on balance shafts in a number of import cars.

In order to remove a pilot bearing from an end of a crankshaft, one conventional method incorporates the use of a slide hammer in conjunction with a set of jaw members and a yoke to hold the two jaw members. Once the jaw members are in position, the slide hammer is slapped against the end of a shaft coupled to the yoke until the bearing is pulled from the crankshaft. Again, this method has the dangers associated with metal striking upon metal and in addition, a certain amount of space is needed to perform the slide hammer function. The present invention achieves this task in a new and safer fashion which requires as little as half the usual operating space.

Figure 12:
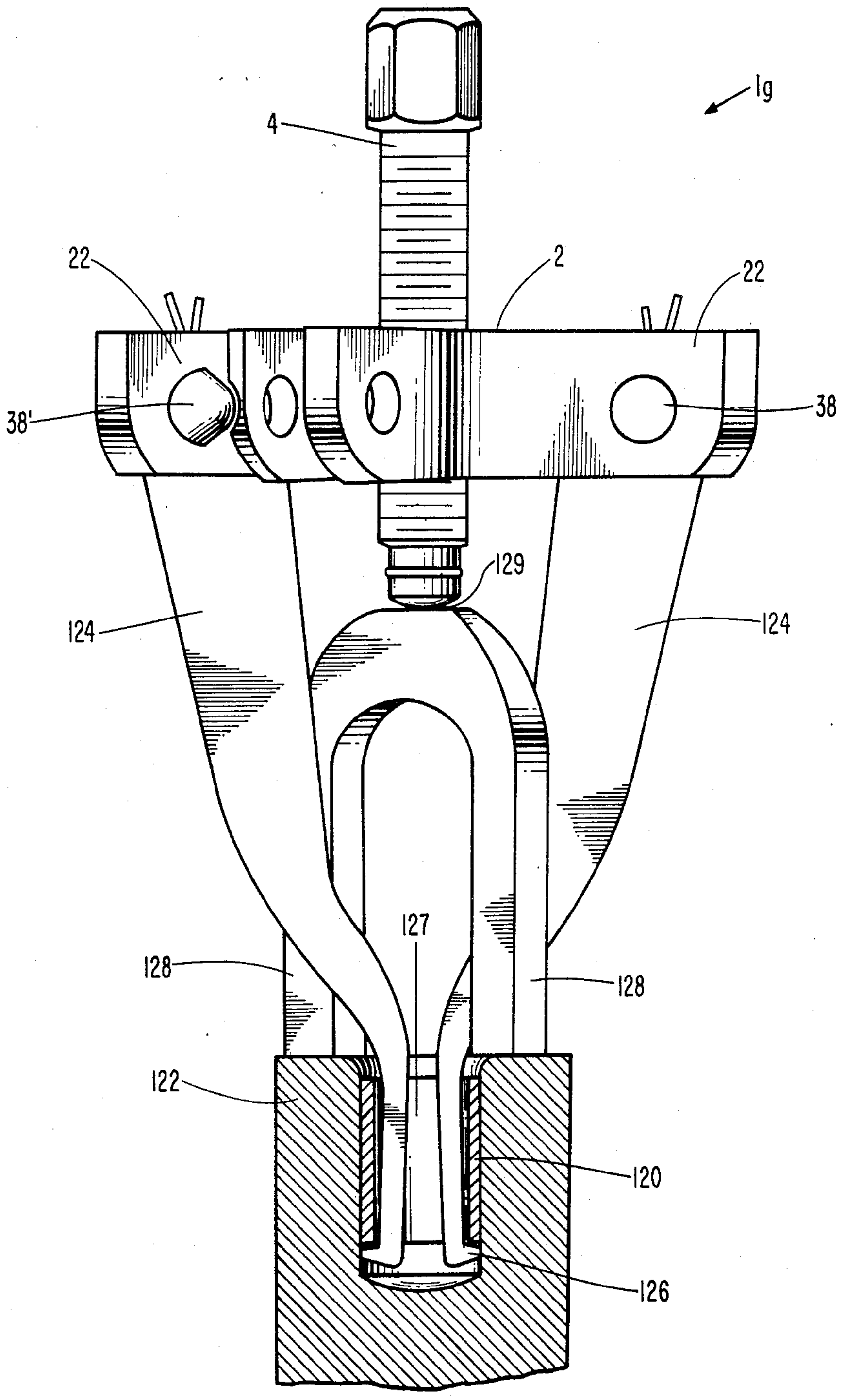
FIG. 12 is an elevational and partial sectional view of an alternative embodiment of the puller tool of FIG. 1 shown in position to remove a pilot bearing from a crankshaft end.

FIG. 12 shows a puller tool 1*g* in accordance with a preferred embodiment of the present invention in position to remove a pilot bearing 120 from the end of a crankshaft 122. The yoke 2 of the puller tool 1*g* has two jaw members 124 mounted between the arm fingers 22 of the opposing yoke arms 6*a* and 6*c*. Each jaw member 124 has an outwardly oriented hook-shaped portion 126 which is inserted through the bearing and engages the end of the bearing within the hole 127 at the end of the crankshaft. The puller tool 1*g* further includes a horseshoe-shaped saddle member 128 which straddles the crankshaft opening and engages the crankshaft end 122. As the central bolt 4 is rotated, the central bolt 4 engages a top surface 129 of the saddle member 128 thereby pulling the bearing 120 from the end of the crankshaft.

Figure 13:
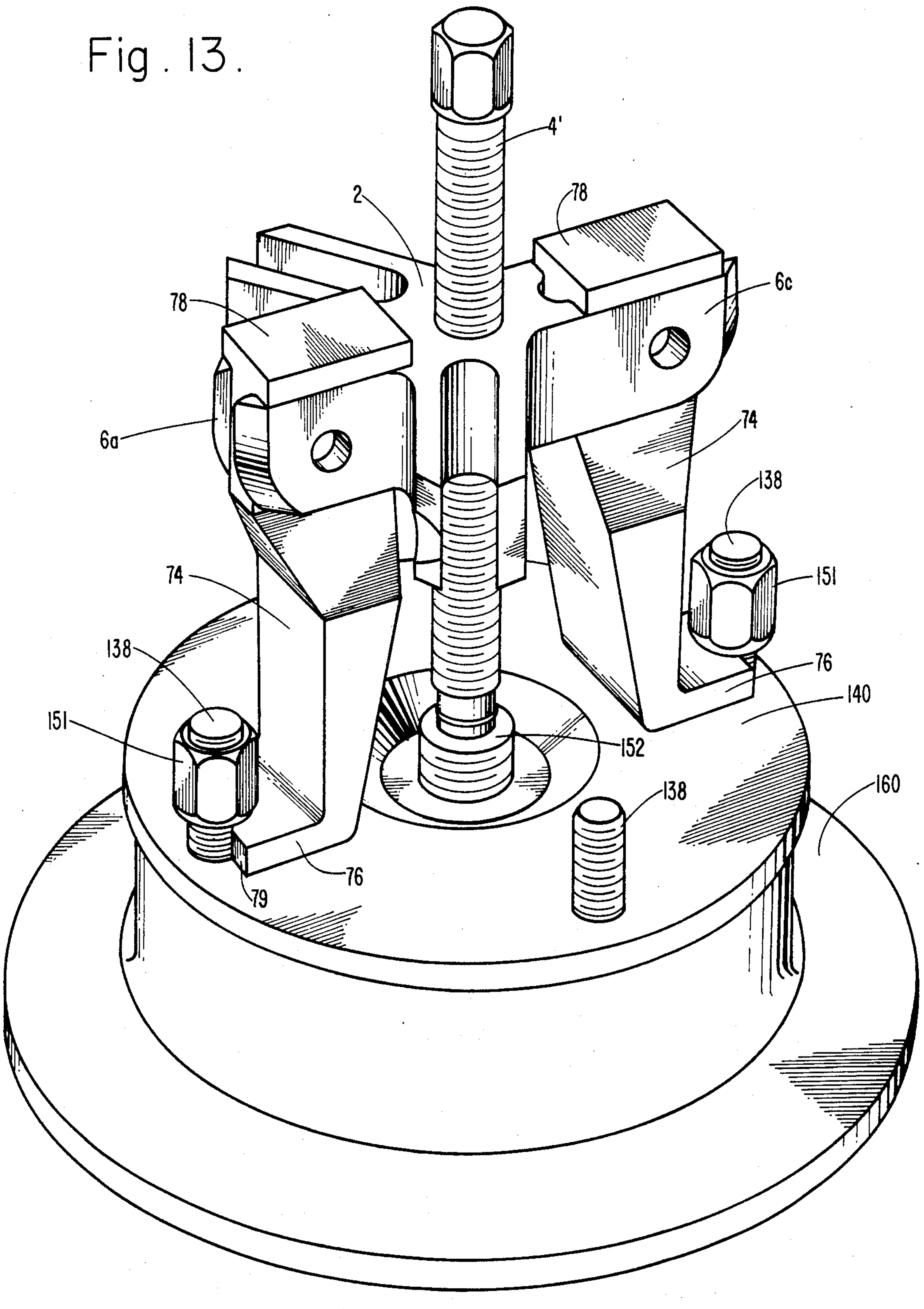
FIG. 13 is an isometric view of an alternative embodiment of the puller tool of FIG. 7 shown in position to remove a wheel hub from an axle spindle.

FIG. 13 shows an additional application of the puller tool of the present invention. In certain small foreign autos, a wheel hub puller tool is used to remove the wheel hubs from the axles. As shown in FIG. 13, the jaw members 74 described in FIG. 8, are shown in a reversed position inside of the associated wheel mount studs 138 of a wheel hub 140. The jaw members 74 are positioned within the open-ended slots 24 so that the notches 80 (not visible in FIG. 13) of each jaw member 74 engages the wheel stud 138. Because each jaw member 74 fits snugly within the open-ended slot of the yoke arms, an arm pin is not needed to hold the jaw members 74 in place. Wheel lug nuts 151 are then screwed onto the wheel mount studs 138. As the central bolt 4' is rotated against the axle 152, the wheel hub 140 and the brake disc 160 are pulled free to allow servicing of the wheel bearings, brake disc and other suspension parts.

Thus, it seen from the above that a unique yoke selectively used in combination with a few accessories can be used to perform a large number of functions which heretofore have generally been performed by separate dedicated tools.

It will, of course, be understood that modifications of the present invention, in its various aspects, will be apparent to those skilled in the art, some being apparent only after study, and others being merely matters of routine mechanical design. As such, the scope and the invention should not be limited by the particular embodiments hereindescribed but should be defined only by the appended claims and equivalents thereof.

What is claimed:

1. A puller tool for removing a first element from a second element, said first element being slidably mounted on the second element, said tool comprising:

a yoke having a central hole threaded therethrough and four arms, each arm having a pair of spaced fingers defining an open-ended slot between the fingers, and a pin hole through the fingers of each arm, and said arms being spaced relative to each other so that two of said arms are diametrically opposed and three of sid arms are equally spaced;

a threaded bolt adapted to be rotatably mounted within the central hole and to engage the second element;

a plurality of arm pins, each arm pin being adapted to be inserted into an arm pin hole;

a plurality of pairs of extender members, each pair of extender members being adapted to be pivotally and removably coupled to an arm pin at one end; and a plurality of jaw members, each jaw member having a hook-shaped end portion adapted to engage the first element and each jaw member being adapted to be pivotally and removably coupled to the other end of a pair of associated extender members and to engage the associated arm pin;

wherein as the central bolt is rotated, the first element is pulled from the second element, and wherein each extender member comprises a bar member having ends which are not coplaner, and wherein the respective jaw members are slideably received in the respective open ended slots.

2. The puller tool of claim 1 further comprising:

a plurality of extension members, each extension member being adapted to be attached to an arm pin wherein each extension member provides a radially disposed engagement surface for an associated jaw member thereby increasing the size of the first member which can be engaged by the jaw members.

3. The puller tool of claim 2 wherein each extension member comprises a washer.

4. A puller tool for removing a first element from a second element, said first element being slidably mounted on the second element, said tool comprising:

a yoke having a central hole threaded therethrough and four arms, each arm having a pair of spaced fingers defining an opened-ended slot between the fingers, and a pin hole through the fingers of each arm, and said arms being spaced relative to each other so that two of said arms are diametrically opposed and three of said arms are equally spaced;

a threaded bolt adapted to be rotatably mounted within the central hole and to engage the second element;

a plurality of arm pins, each arm pin being adapted to be inserted into an arm pin hole;

a plurality of pairs of extender members, each pair of extender members being adapted to be pivotally and removably coupled to an arm pin at one end; and a plurality of jaw members, each jaw member having a hook-shaped end portion adapted to engage the first element and each jaw member being adapted to be pivotally and removably coupled to the other end of a pair of associated extender members and to engage the associated arm pin;

wherein as the central bolt is rotated, the first element is pulled from the second element, and wherein a yoke arm has a notch to accommodate the passage of an arm pin through the arm pin holes of an adjacent yoke arm.

5. A puller tool for removing a first element from a second element, said first element being slidably mounted on the second element, said tool comprising:

at least two holding threaded bolts, each holding bolt being adapted to be threadably coupled to the first element, and each holding bolt further having an enlarged head;

a yoke having a central hole threaded therethrough and four arms, each arm having a pair of spaced fingers defining an opened ended slot between the fingers and adapted to receive a bolt, each arm further having a pin hole through the fingers of each arm, said fingers having a flat upper surface adapted to support and engage the enlarged head of a holding bolt, and said surface and slot having a length of approximately twice the diameter of the central hole to accommodate variable placement of a bolt within the slot, and said arms being spaced relative to each other so that two of said arms are diametrically opposed and three of said arms are equally spaced; and a third threaded bolt adapted to be rotatably mounted within the central hole and to engage the second element;

wherein as the central bolt is rotated, the first element is pulled from the second element.

6. The tool of claim 5 further comprising a plurality of washers, each washer being adapted to be inserted between the enlarged head of an associated holding bolt and the upper surface portion of an associated yoke arm.

7. A puller tool for removing a first element from a second element, said first element being slidably mounted on the second element, said puller tool comprising:

a pair of removable jaws, each jaw having an overhanging head portion for engaging a top surface of an associated yoke arm;

a yoke having a central hole threaded therethrough and four arms, each arm having a pair of spaced fingers defining an open-ended slot between the fingers and adapted to receive a jaw, each arm further having a pin hole through the fingers of each arm, said fingers having a flat upper surface adapted to support the overhanging head portion of a jaw, and said surface and slot having a length of approximately twice the diameter of the central hole to accommodate variable placement of a jaw within the slot, and said arms being spaced relative to each other so that two of said arms are diametrically opposed and three of said arms are equally spaced; and a threaded bolt adapted to be rotatably mounted within the central hole and to engage the second element.

8. The puller tool of claim 7 wherein each jaw has a hooked lower portion which defines a notch and a second surface on either side of the notch;

wherein said jaws may be carried by the yoke arms in an opposing relationship with a second element of a first diameter placed between the notches of the opposing jaws or a second element of a smaller diameter placed between the second surfaces of opposing jaws.

9. The puller tool of claim 7 wherein said yoke arms each have a pair of rounded surfaces adjacent the slot and each jaw member overhanging head portion has a pair of rounded surfaces adapted to mate with the yoke arm rounded surfaces when the jaw member is inserted into the yoke arm slot.

10. The puller tool of claim 7 further comprising a tip adapted to be coupled to an end of the threaded bolt for machining the second element while held between the tool jaws and tool tip.

11. A puller tool of the type that includes jaw puller and other puller members for removing a first element from a second element, said first element being slidably carried within a hole of the second element, said tool comprising:

at least two jaw puller members, each jaw member having a hole at one end and an outwardly oriented hook-shaped portion at the other end to engage the first element;

a pair of pins, each pin adapted to be inserted through the jaw puller member hole and the finger holes of an associated yoke arm to couple the jaw puller member to the yoke arm;

a body having a central hole threaded therethrough and four arms, each arm having a pair of spaced fingers defining an open-ended slot between the fingers and adapted to receive a puller member, each arm further having a pin hole through the fingers of each arm, said fingers having a flat upper surface adapted to support a puller member, and said surface and slot having a length of approximately twice the diameter of the central hole to accommodate variable placement of a puller member within the slot, and said arms being spaced relative to each other so that two of said arms are diametrically opposed and three of said arms are equally spaced;

a saddle member for straddling the second element hole and engaging the second element; and a central threaded bolt adapted to be rotatably mounted within the central hole and to engage the saddle member;

wherein as the central bolt is rotated, the first element is pulled from the second element.

12. A puller tool of the type which includes puller members for removing a first element from a second element, said first element being slidably mounted on the second element, said tool comprising:

a yoke having a central hole threaded therethrough and four arms, each arm having a pair of spced fingers defining an open-ended slot between the fingers and adapted to receive a puller member, each arm further having a pin hole through the fingers of each arm, said fingers having a flat upper surface adapted to support a puller member, and said surface and slot having a length of approximately twice the diameter of the central hole to accommodate variable placement of a puller member within the slot, and said arms being spaced relative to each other so that two of said arms are diametrically opposed and three of said arms are equally spaced;

a threaded bolt adapted to be rotatably mounted within the central hole and to engage the second element;

a plurality of arm pins, each arm pin being adapted to be inserted into an arm pin hole; and a plurality of jaw puller members, each jaw puller member having a hook-shaped end portion adapted to engage the first element and each jaw member being adapted to be pivotally and removably coupled to an arm pin inserted into a yoke arm pin hole;

wherein as the central bolt is rotated, the first element is pulled from the second element.

13. A puller tool kit of the type which includes puller members for removing a first element from a second element, said first element being slidably mounted on the second element, said tool comprising:

a yoke having a central hole threaded therethrough and four arms, each arm having a pair of spaced fingers defining an open-ended slot between the fingers and adapted to receive a puller member, each arm further having a pin hole through the fingers of each arm, said fingers having a flat upper surface adapted to support a puller member, and said surface and slot having a length of approximately twice the diameter of the central hole to accommodate variable placement of a puller member within the slot, and said arms being spaced relative to each other so that two of said arms are diametrically opposed and three of said arms are equally spaced;

a threaded bolt adapted to be rotatably mounted within the central hole and to engage the second element;

a plurality of arm pins, each arm pin being adapted to be removably inserted into an arm pin hole;

a plurality of extender members, each extender member being adapted to be pivotally and removably coupled to an arm pin at one end;

a plurality of jaw puller members, each jaw puller member having a hook-shaped end portion adapted to engage the first element and each jaw puller member being adapted to be pivotally and removably coupled to the other end of an associated extender member and to engage the associated arm pin, each jaw puller member further being adapted to be pivotally and removably coupled directly to an associated arm pin within a yoke arm slot;

a plurality of second jaw puller members, each second jaw puller member being adapted to be removably carried within an arm slot and having an overhanging head portion for engaging a top surface of an associated yoke arm;

wherein as the central bolt is rotated, the first element is pulled from the second element.

14. A yoke for a puller tool having a plurality of puller members, comprising:

a body having a central hole threaded therethrough and four arms, each arm having a pair of spaced fingers defining an open-ended slot between the fingers and adapted to receive a puller member, each arm further having a pin hole through the fingers of each arm, said fingers having a flat upper surface adapted to support a puller member, and said surface and slot having a length of approximately twice the diameter of the central hole to accommodate variable placement of a puller member within the slot, and said arms being spaced relative to each other so that two of said arms are diameterically opposed and three of said arms are equally spaced.

15. The yoke of claim 14 wherein the space fingers of at least two yoke arms each have a pair of rounded surfaces adjacent the flat surfaces and defining a portion of the slot therebetween.

* * * * *